United States Patent
Endo

(10) Patent No.: US 10,831,184 B2
(45) Date of Patent: Nov. 10, 2020

(54) DATA PROCESSING APPARATUS, DATA PROCESSING SYSTEM, DATA PROCESSING METHOD, AND NON-TRANSITORY STORAGE MEDIUM

(71) Applicant: NEC CORPORATION, Tokyo (JP)

(72) Inventor: Kaoru Endo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/085,665

(22) PCT Filed: Jan. 20, 2017

(86) PCT No.: PCT/JP2017/001877
§ 371 (c)(1),
(2) Date: Sep. 17, 2018

(87) PCT Pub. No.: WO2017/163569
PCT Pub. Date: Sep. 28, 2017

(65) Prior Publication Data
US 2019/0087186 A1  Mar. 21, 2019

(30) Foreign Application Priority Data
Mar. 23, 2016 (JP) ................. 2016-058004

(51) Int. Cl.
G05B 23/02 (2006.01)
G06N 20/00 (2019.01)
G05D 27/02 (2006.01)

(52) U.S. Cl.
CPC ........... *G05B 23/02* (2013.01); *G05B 23/024* (2013.01); *G05D 27/02* (2013.01); *G06N 20/00* (2019.01);
(Continued)

(58) Field of Classification Search
None
See application file for complete search history.

(56) References Cited

U.S. PATENT DOCUMENTS 8,743,256 B2 6/2014 Ogasawara et al.
9,014,685 B2 4/2015 Bathiche et al.
(Continued)

FOREIGN PATENT DOCUMENTS

CN 101802561 A 8/2010
CN 102136761 A 7/2011
(Continued)

OTHER PUBLICATIONS

Communication dated Mar. 29, 2019, from the European Patent Office in counterpart application No. 17769616.8.
(Continued)

*Primary Examiner* — Sean Shechtman
(74) *Attorney, Agent, or Firm* — Sughrue Mion, PLLC

(57) ABSTRACT

A data processing apparatus including a waveform data acquisition unit which acquires waveform data of a consumption current and/or a voltage of a target device, a feature value extraction unit which extracts a waveform feature value from the waveform data, an environment data acquisition unit which acquires environment data indicating an environment of the target device at the time when the waveform data is acquired, an operation state data acquisition unit which acquires operation state data indicating an operation state of the target device at the time the waveform data is acquired, a distance calculation unit which calculates a distance between each of members including the waveform feature value, the environment data, and the operation state data, and each of a plurality of reference members, a grouping unit which groups the members, and a registration unit which registers a group satisfying a predetermined condition as training data.

10 Claims, 8 Drawing Sheets

(52) U.S. Cl.
CPC .............. *G05B 2219/33034* (2013.01); *G05B 2219/33038* (2013.01); *Y02E 60/74* (2013.01); *Y04S 10/30* (2013.01)

(56) References Cited

U.S. PATENT DOCUMENTS

| | | |
|---|---|---|
| 2012/0041575 A1 | 2/2012 | Maeda et al. |
| 2016/0154038 A1* | 6/2016 | Toizumi ................ G01R 21/00 702/61 |

FOREIGN PATENT DOCUMENTS

| | | | |
|---|---|---|---|
| CN | 102257694 A | 11/2011 | |
| CN | 102414956 A | 4/2012 | |
| CN | 103034267 A | 4/2013 | |
| EP | 2333629 A1 | 6/2011 | |
| JP | 2010092355 A | 4/2010 | |
| JP | 2010-191556 A | 9/2010 | |
| JP | 2013-8111 A | 1/2013 | |
| JP | 2013-201230 A | 10/2013 | |
| JP | 2014-167667 A | 9/2014 | |
| JP | 2014-206417 A | 10/2014 | |
| JP | WO 2015/008645 * | 1/2015 | ............ G01R 21/00 |
| TW | 200919210 A | 5/2009 | |
| TW | 201037637 A1 | 10/2010 | |
| TW | 201103305 A1 | 1/2011 | |
| TW | I461056 B | 11/2014 | |
| WO | 2015008645 A1 | 1/2015 | |
| WO | 2015145865 A1 | 10/2015 | |
| WO | 2015151789 A1 | 10/2015 | |

OTHER PUBLICATIONS

International Search Report for PCT/JP2017/001877 dated Mar. 21, 2017 [PCT/ISA/210].
Communication dated Apr. 19, 2019, from the Intellectual Property Office of Taiwan in counterpart Application No. 106103438.
Notice of Reasons for Refusal dated Oct. 29, 2019 from the Japanese Patent Office in application No. 2016-058004.
Communication dated Jul. 22, 2020 by the China National Intellectual Property Administration in application No. 201780019327.5.

* cited by examiner

FIG. 3

| PROCESSING UNIT DATA ID | WAVEFORM FEATURE VALUE | EXTERNAL ENVIRONMENT DATA | | | | OPERATION STATE DATA | DISTANCE |
|---|---|---|---|---|---|---|---|
| | | WEATHER | TEMPERATURE | HUMIDITY | . . . | | |
| . . . . | . . . . | . . . . | . . . . | . . . . | . . . . | . . . . | . . . . |

FIG. 4

| TRAINING DATA ID | WAVEFORM FEATURE VALUE | EXTERNAL ENVIRONMENT DATA ||||  OPERATION STATE DATA |
| --- | --- | --- | --- | --- | --- | --- |
| | | WEATHER | TEMPERATURE | HUMIDITY | . . . | |
| . . . . | . . . . | . . . . | . . . . | . . . . | . . . | . . . . |

FIG. 5

| GROUP ID | MEMBER | REPRESENTATIVE DISTANCE |
|----------|--------|-------------------------|
| ⋮ | ⋮ | ⋮ |

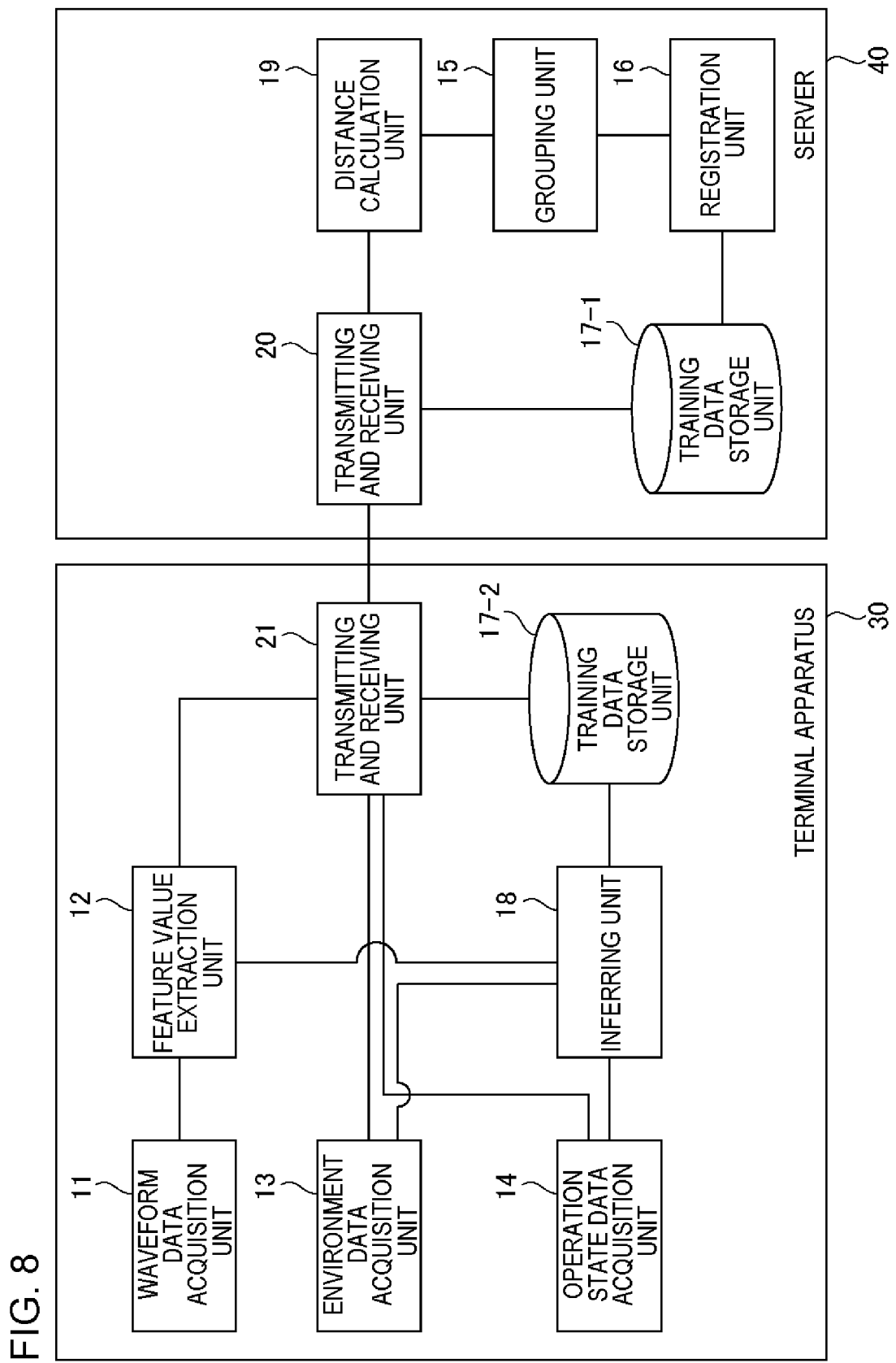

DATA PROCESSING APPARATUS, DATA PROCESSING SYSTEM, DATA PROCESSING METHOD, AND NON-TRANSITORY STORAGE MEDIUM

CROSS REFERENCE TO RELATED APPLICATIONS

This application is a National Stage of International Application No. PCT/JP2017/001877 filed Jan. 20, 2017, claiming priority based on Japanese Patent Application No. 2016-058004 filed Mar. 23, 2016, and the disclosure of which is incorporated herein in its entirety.

TECHNICAL FIELD

The present invention relates to a data processing apparatus, a data processing system, a data processing method, and a program.

BACKGROUND ART

Related techniques are disclosed in Patent Documents 1 to 3.

Patent Document 1 discloses an apparatus that diagnoses the presence or absence of an abnormality sign of machine equipment, on the basis of multidimensional sensor data measured by a plurality of sensors.

Patent Documents 2 and 3 disclose methods of determining the type and operation situation of an electric device, on the basis of a current waveform.

RELATED DOCUMENT

Patent Document

[Patent Document 1] Japanese Patent Application Publication No. 2013-8111
[Patent Document 2] Japanese Patent Application Publication No. 2014-206417
[Patent Document 3] Japanese Patent Application Publication No. 2013-201230

SUMMARY OF THE INVENTION

Technical Problem

In any of Patent Documents 1 to 3, measurement data (training data) indicating a predetermined state (for example, a state without abnormality, a predetermined operation situation, or the like) needs to be generated in advance. The measurement data may vary depending on the operation state of the target device and the external environment. Generating various training data corresponding to various operation states and various external environments requires a lot of time and labor.

An object of the present invention is to provide a new technique for generating training data for inferring the state of the electric device.

Solution to Problem

According to the present invention, there is provided a data processing apparatus including
a waveform data acquisition unit which acquires waveform data of a consumption current and/or a voltage of a target device;
a feature value extraction unit which extracts a waveform feature value from the waveform data;
an environment data acquisition unit which acquires environment data indicating an environment of the target device at the time when the waveform data is acquired;
an operation state data acquisition unit which acquires operation state data indicating an operation state of the target device at the time when the waveform data is acquired;
a distance calculation unit which calculates a distance between each of members including the waveform feature value, the environment data, and the operation state data and each of a plurality of reference members;
a grouping unit which groups the members, on the basis of the distance from each of the plurality of reference members; and
a registration unit which registers a group satisfying a predetermined condition as training data.

Further, according to the present invention, there is provided a data processing system including
a plurality of terminal apparatuses and a server,
in which each of the terminal apparatuses includes
a waveform data acquisition unit which acquires waveform data of a consumption current and/or a voltage of a target device;
a feature value extraction unit which extracts a waveform feature value from the waveform data;
an environment data acquisition unit which acquires environment data indicating an environment of the target device at the time when the waveform data is acquired;
an operation state data acquisition unit which acquires operation state data indicating an operation state of the target device at the time when the waveform data is acquired; and
a transmitting and receiving unit which transmits the waveform feature value, the environment data, and the operation state data to the server, and
in which the server includes
a transmitting and receiving unit which receives the waveform feature value, the environment data, and the operation state data from each of the plurality of terminal apparatuses;
a distance calculation unit which calculates a distance between each of members including the waveform feature value, the environment data, and the operation state data and each of a plurality of reference members;
a grouping unit which groups the members, on the basis of the distance from each of the plurality of reference members; and
a registration unit which registers a group satisfying a predetermined condition as training data.

Further, according to the present invention, there is provided a data processing method executed by a computer, the method including
a waveform data acquisition step of acquiring waveform data of a consumption current and/or a voltage of a target device;
a feature value extraction step of extracting a waveform feature value from the waveform data;
an environment data acquisition step of acquiring environment data indicating an environment of the target device at the time when the waveform data is acquired;
an operation state data acquisition step of acquiring operation state data indicating an operation state of the target device at the time when the waveform data is acquired;

a distance calculation step of calculating a distance between each of members including the waveform feature value, the environment data, and the operation state data and each of a plurality of reference members;

a grouping step of grouping the members, on the basis of the distance from each of the plurality of reference members; and a registration step of registering a group satisfying a predetermined condition as training data.

Further, according to the present invention, there is provided a program causing a computer to function as:

a waveform data acquisition unit which acquires waveform data of a consumption current and/or a voltage of a target device;

a feature value extraction unit which extracts a waveform feature value from the waveform data;

an environment data acquisition unit which acquires environment data indicating an environment of the target device at the time when the waveform data is acquired;

an operation state data acquisition unit which acquires operation state data indicating an operation state of the target device at the time when the waveform data is acquired;

a distance calculation unit which calculates a distance between each of members including the waveform feature value, the environment data, and the operation state data and each of a plurality of reference members;

a grouping unit which groups the members, on the basis of the distance from each of the plurality of reference members; and a registration unit which registers a group satisfying a predetermined condition as training data.

Advantageous Effects of Invention

According to the present invention, a new technique for generating training data for inferring the state of the electric device is realized.

BRIEF DESCRIPTION OF THE DRAWINGS

The foregoing and other objects, features and advantages will become more apparent from the following description of preferred example embodiments and the accompanying drawings.

FIG. 3 is a diagram schematically illustrating an example of data processed by the data processing apparatus of the present example embodiment.

FIG. 4 is a diagram schematically illustrating another example of data processed by the data processing apparatus of the present example embodiment.

FIG. 5 is a diagram schematically illustrating a still another example of data processed by the data processing apparatus of the present example embodiment.

FIG. 8 is an example of a functional block diagram of a data processing system of the present example embodiment.

DESCRIPTION OF EMBODIMENTS

First, an example of a hardware configuration of an apparatus (data processing apparatus) of the present example embodiment will be described. Each unit included in the apparatus of the present example embodiment is configured with any combination of hardware and software of any computer, mainly using a central processing unit (CPU), a memory, a program to be loaded into the memory, and a storage unit such as a hard disk storing the program (can store programs stored in advance in the stage of shipping the apparatus, and also store programs downloaded from a storage medium such as a compact disc (CD) or a server on the Internet), and a network connection interface. Those skilled in the art will understand that there are various modifications in the realization methods and apparatuses.

Figure 1:
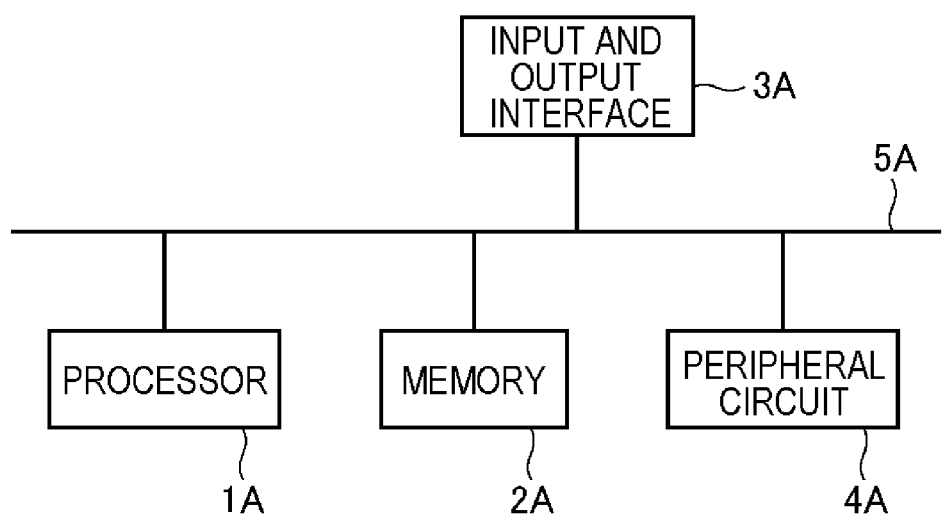
FIG. 1 is a diagram conceptually illustrating an example of a hardware configuration of an apparatus of a present example embodiment.

FIG. 1 is a block diagram illustrating a hardware configuration of an apparatus of the present example embodiment. As illustrated in FIG. 1, the apparatus includes a processor 1A, a memory 2A, an input and output interface 3A, a peripheral circuit 4A, and a bus 5A. The peripheral circuit includes various modules.

The bus 5A is a data transmission path through which the processor 1A, the memory 2A, the peripheral circuit 4A and the input and output interface 3A mutually transmit and receive data. The processor 1A is, for example, an arithmetic processing apparatus such as a central processing unit (CPU) or a graphics processing unit (GPU). The memory 2A is, for example, a memory such as a random access memory (RAM) or a read only memory (ROM). The input and output interface 3A includes an interface for acquiring information from an external apparatus, an external server, an external sensor, or the like. The processor 1A issues commands to each module and performs calculations on the basis of the calculation results thereof.

Hereinafter, the present example embodiment will be described. Note that, the functional block diagram used in the description of the following exemplary example embodiment shows function-based blocks rather than hardware-based configurations. These drawings show that each apparatus is configured with a single apparatus, but configuration means of each apparatus is not limited to this. That is, it may be a physically separated configuration or a logically divided configuration. Note that, the same reference numerals are attached to the same configuration components, and the description thereof will not be repeated.

First Example Embodiment

A data processing apparatus 10 of the present example embodiment provides a function of collecting training data used for inferring the state of a target device. This will be described in detail below.

Figure 2:
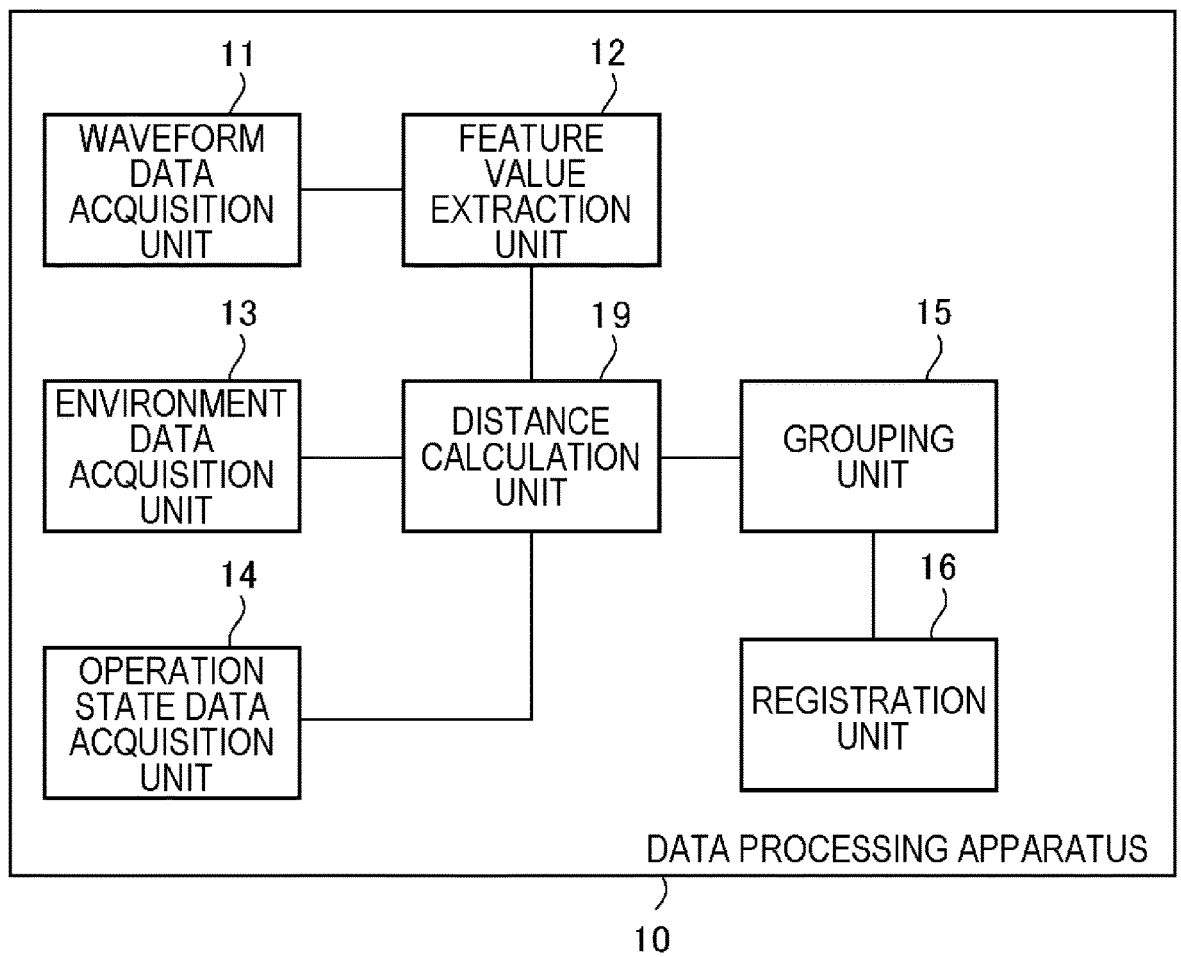
FIG. 2 is an example of a functional block diagram of a data processing apparatus of the present example embodiment.

FIG. 2 illustrates an example of a functional block diagram of the data processing apparatus 10 of the present example embodiment. As illustrated, the data processing apparatus 10 includes a waveform data acquisition unit 11, a feature value extraction unit 12, an environment data acquisition unit 13, an operation state data acquisition unit 14, a grouping unit 15, a registration unit 16, and a distance calculation unit 19.

The waveform data acquisition unit 11 acquires waveform data of a consumption current and/or a voltage of a target device;

The target device may be a household appliance used in a general household, an office appliance used in an office, factory equipment used in a factory or the like, or the like. A measurement sensor installed at a predetermined position continuously measures waveform data of the consumption current and/or voltage of a corresponding one target device.

The waveform data acquisition unit 11 continuously acquires the waveform data measured by the measurement sensor. The waveform data is associated with the date and time information of the measurement timing by any means. Note that, the waveform data measured by the measurement sensor may be stored in the waveform data database (DB) in association with the date and time information. Then, the waveform data acquisition unit 11 may acquire waveform data from the waveform data DB. In addition, the waveform data acquisition unit 11 may acquire waveform data without going through the waveform data DB.

The feature value extraction unit 12 extracts a predetermined waveform feature value from the waveform data acquired by the waveform data acquisition unit 11. The feature value extraction unit 12 may divide the waveform data into processing unit data at predetermined time intervals and extract the waveform feature value for each piece of processing unit data.

As the waveform feature value, intensity and phase of the frequency (harmonic component) of the consumption current, a phase, a change in a consumption current, an average value, a peak value, an effective value, a crest factor, a waveform factor, a convergence time of current change, an energizing time, a peak position, a time difference between the peak position of the voltage and the peak position of the consumption current, the power factor, and the like are conceivable, but the invention is not limited thereto. The feature value extraction unit 12 extracts one or plural types of predetermined waveform feature values.

The environment data acquisition unit 13 acquires environment data indicating an environment of the target device at the time when the waveform data is acquired. The environment data acquisition unit 13 may acquire, for example, at least one of temperature, humidity, and weather, as the environment data. The environment data is associated with observation date and time information by any means.

For example, the environment data acquisition unit 13 may acquire the temperature and/or the humidity measured by a measurement sensor installed around the target device. The environment data acquisition unit 13 continuously acquires the temperature and/or the humidity measured by the measurement sensor. The data is associated with the date and time information of the measurement timing by any means. The temperature and/or the humidity measured by the measurement sensor may be stored in the temperature and/or humidity DB in association with the date and time information. Then, the environment data acquisition unit 13 may acquire the data from the temperature and/or humidity DB. In addition, the environment data acquisition unit 13 may acquire the data without going through the temperature and/or humidity DB.

Further, the environment data acquisition unit 13 may acquire weather information on the installation location of the target device published on the Internet, from a predetermined server, for example. In this case, the environment data acquisition unit 13 retains in advance information indicating the installation location of the target device. Then, the environment data acquisition unit 13 requests weather information corresponding to the installation location from the server and acquires the weather information. In addition, the operator may input the weather information to the environment data acquisition unit 13.

Note that, the environment data acquisition unit 13 may acquire the latest actual weather information to be announced at predetermined time intervals (weather information which is different from the weather forecast and is actually observed at each timing) at predetermined time intervals, from the server or the operator. In addition, the environment data acquisition unit 13 may acquire the previously announced weather forecast from the server or the operator, and acquire from the weather forecast, the weather information at the time when the waveform data is acquired.

The operation state data acquisition unit 14 acquires operation state data indicating an operation state of the target device at the time when the waveform data is acquired. The operation state data acquisition unit 14 can acquire the operation state data from the target device and/or a measurement sensor attached to the target device. The operation state data is associated with the date and time information in which each operation state is observed, by any means.

The operation state data acquisition unit 14 continuously acquires the operation state data from the target device and/or the measurement sensor. The operation state data is associated with the date and time information of the measurement timing by any means. The operation state data measured by the target device and/or the measurement sensor may be stored in the operation state data DB in association with the date and time information. Then, the operation state data acquisition unit 14 may acquire the operation state data from the operation state DB. In addition, the operation state data acquisition unit 14 may acquire the operation state data without going through the operation state DB.

Here, the operation state data will be described. If pieces of the operation state data are different from each other, the contents (shape or the like) of pieces of the waveform data of consumption current and/or voltage may differ from each other. Hereinafter, an example of the operation state data will be described for each type of target device.

For example, in a case where the target device is an air conditioner, as the operation state data, data indicating an operating state (standby, in operation, or the like), data indicating operation mode (heating, cooling, dehumidification, or the like), set temperature, ambient temperature of the outdoor unit, the number of revolutions of the fan of the outdoor unit, room temperature, the number of revolutions of the fan of the indoor unit, the operating state of a compressor (maximum XX % or the like), and the like are conceivable.

In a case where the target device is a petroleum fan heater, as the operation state data, an operating state (standby, in-operation or the like), an operation mode (normal mode, eco mode, or the like), set temperature, the number of revolutions of a fan, or the like are conceivable.

In a case where the target device is a freezing machine (business use, large type), as the operation state data, the operating state (freezing, defrosting, or the like), the set temperature, the ambient temperature of the outdoor unit, the operating state of a compressor (maximum XX % or the like), or the like are conceivable.

In a case where the target device is a freezer (for business use, small size), as the operation state data, the operating state (refrigeration, defrosting, or the like), set temperature, ambient temperature of the outdoor unit, the number of revolutions of the fan of the outdoor unit, room temperature, the number of revolutions of the fan of the indoor unit, the operating state of the compressor (maximum XX % or the like), and the like can be conceivable.

In a case where the target device is a microwave oven, as the operation state data, an operating state (standby, heating, or the like), power setting, or the like are conceivable.

In a case where the target device is a television, as the operation state data, an operating state (standby, watching, recording, or the like) is conceivable.

In a case where the target device is a refrigerator, as the operation state data, the operating state (refrigeration, defrosting, or the like), inside temperature, ambient temperature, the operating state of a compressor (maximum XX % or the like), or the like are conceivable.

In a case where the target device is a personal computer, as the operation state data, an operating state (standby, in-operation, or the like) is conceivable.

In a case where the target device is a washing machine, as the operation state data, an operating state (washing, rinsing, dehydrating, standby, or the like) is conceivable.

In a case where the target device is a lighting device, as the operation state data, an operating state (standby, lighting, or the like), dimming state (XX %), or the like is conceivable.

In a case where the target device is a warmer/cooler (showcase), as the operation state data, an operating state (standby, keeping warm, keeping cold, or the like), an operation mode (keeping warm, keeping cold, or the like), the operating state of a compressor (such as maximum XX %), inside temperature, ambient temperature, and the like are conceivable.

In a case where the target device is a copy machine, as the operation state data, an operating state (standby, copying, or the like), or the like is conceivable.

In a case where the target device is an automatic teller machine (ATM), as the operation state data, an operating state (standby, depositing, withdrawal, or the like), or the like is conceivable.

In a case where the target device is a sign board illumination, as the operation state data, an operating state (lighting on, lighting off, or the like), or the like is conceivable.

In a case where the target device is a fryer, as the operation state data, an operating state (standby, heating, or the like), or the like is conceivable.

In a case where the target device is a dish washer, as the operation state data, an operating state (standby, washing, drying, or the like), or the like is conceivable.

In a case where the target device is a coffee maker (fully automatic), as the operation state data, an operating state (standby, extracting, boiling, cleaning, or the like), or the like is conceivable.

In a case where the target device is a cash register and point of sale (POS) system, as the operation state data, an operating state (standby, inputting, putting money in, taking money out, printing or the like) or the like is conceivable.

Values other than the distance in the data illustrated in FIG. 3 are obtained by the waveform data acquisition unit 11, the feature value extraction unit 12, the environment data acquisition unit 13, and the operation state data acquisition unit 14 which are described above. In the data illustrated in FIG. 3, information (processing unit data identifier (ID)) for identifying each piece of processing unit data which is a unit for extracting a waveform feature value from waveform data, a waveform feature value extracted from each piece of processing unit data, external environment data at the timing at which each piece of processing unit data is measured, operation state data at the timing at which each piece of processing unit data is measured, and a distance calculated by the distance calculation unit 19 described below are associated with each other. When new data is processed by the waveform data acquisition unit 11, the feature value extraction unit 12, the environment data acquisition unit 13, and the operation state data acquisition unit 14, the data illustrated in FIG. 3 is updated as needed (new data is added).

Note that, the "external environment data at the timing at which each piece of processing unit data is measured" may be external environment data measured at the same timing as the date and time (target timing) at which the processing unit data is measured, the timing closest to the target timing, the closest timing after the target timing, or the closest timing before the target timing. In addition, since the processing unit data (waveform data of the processing unit) has a fixed time width, depending on the measurement interval of the external environment data, a plurality of values are measured corresponding to various types of external environment data in the time width. In this case, statistical values (average value, maximum value, minimum value, mode value, intermediate value, or the like) of the plurality of values may be used as the external environment data at the timing when the processing unit data is measured.

Similarly, the "operation state data at the timing at which each piece of processing unit data is measured" means the operation state data measured at the same timing as the date and time (target timing) at which the processing unit data is measured, the timing closest to the target timing, the closest timing after the target timing, or the closest timing before the target timing. In addition, since the processing unit data (waveform data of the processing unit) has a fixed time width, depending on the measurement interval of the operation state data, a plurality of values are measured corresponding to various types of operation state data in the time width. In this case, statistical values (average value, maximum value, minimum value, mode value, intermediate value, or the like) of the plurality of values may be used as the operation state data at the timing when the processing unit data is measured.

Returning to FIG. 2, the distance calculation unit 19 calculates a distance between a member including the waveform feature value extracted by the feature value extraction unit 12, the environment data acquired by the environment data acquisition unit 13, and the operation state data acquired by the operation state data acquisition unit 14 and each of a plurality of reference members. The waveform feature value, the environment data, and the operation state data, which correspond to one processing unit data ID illustrated in FIG. 3 are one member.

Each reference member includes the waveform feature value, the environment data, and the operation state data. In the present example embodiment, each training data registered at that time is set as each reference member.

FIG. 4 schematically shows an example of the registered training data. In the data illustrated in FIG. 4, information (training data ID) for identifying each of a plurality of pieces of training data, a waveform feature value, external environment data, and operation state data are associated with each other. The information is updated by editing by the operator and registration of new training data by the registration unit 16 to be described below.

For example, as a preprocess for starting the training data generation process of the present example embodiment, the operator registers two or more pieces of training data. In the first stage, the training data registered in this way becomes the reference member. Thereafter, when new training data is registered by the registration unit 16 as the training data generation process of the present example embodiment proceeds, the number of reference members increases accordingly.

The distance calculation unit 19 calculates the distance (similarity) between the newly acquired member and each piece of the training data (reference members) registered at that time. The distance calculation method is a design matter. For example, the distance may be calculated by machine learning. In addition, multidimensional coordinates may be obtained by standardizing various waveform feature values, various environment data, and various operation state data in accordance with predetermined rules, corresponding to each member and each reference member, and arranging them in a predetermined order. Then, the distance between the coordinate values may be calculated.

Through the process by the distance calculation unit 19, the value in the distance column in FIG. 3 is determined. In a case where the number of pieces of the reference data at the time of calculating distances is N (N is an integer of 2 or more), the N number of distances corresponding to each member are calculated and registered in the distance column as N-dimensional data.

Returning to FIG. 2, the grouping unit 15 groups members, on the basis of the distance from each of the plurality of reference members. Specifically, the grouping unit 15 groups members having similar distance values (N-dimensional data). The grouping method is a design matter, but an example will be described below.

Figure 5:
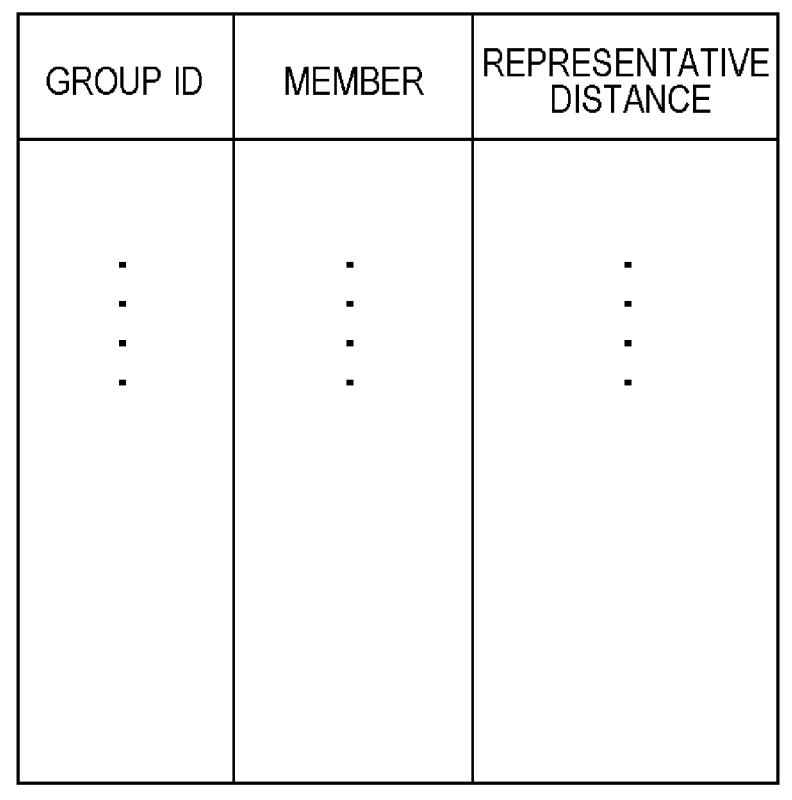

First, if the first member is given, the grouping unit 15 issues a group ID and makes the first member belong to the first group. Then, the distance (N-dimensional data) of the first member is registered as the representative distance of the first group. Thus, the information illustrated in FIG. 5 is updated.

Next, when the second member is given, the grouping unit 15 calculates the similarity between the distance (N-dimensional data) of the second member and the representative distance (N-dimensional data) of the first group registered at that time. For example, the grouping unit 15 handles N-dimensional data as N-dimensional coordinates and calculates the distance between the coordinates as the similarity.

Then, the grouping unit 15 determines whether or not the similarity is equal to or less than a predetermined value (design matter). In a case where the similarity is equal to or less than the predetermined value (design matter), the grouping unit 15 makes the second member belong to the first group. Then, on the basis of the distance (N-dimensional data) of the first member and the distance (N-dimensional data) of the second member, the representative distance (N-dimensional data) of the first group is calculated and updated. For example, the average value of the distance (N-dimensional data) of the first member and the distance (N-dimensional data) of the second member is used as the representative distance (N-dimensional data) of the first group. Thus, the information illustrated in FIG. 5 is updated.

On the other hand, in a case where the similarity is not equal to or less than the predetermined value (design matter), the grouping unit 15 issues a new group ID and makes the second member belong to the second group. Then, the distance (N-dimensional data) of the second member is registered as the representative distance of the second group. Thus, the information illustrated in FIG. 5 is updated.

For example, when a new member is given to the grouping unit 15 in this way, the grouping unit 15 may calculate the similarity between the distance of the new member (N-dimensional data) and the representative distance (N-dimensional data) of each group registered at that time, and group members having a similarity equal to or less than a predetermined value.

Returning to FIG. 2, the registration unit 16 registers groups satisfying the predetermined condition as training data indicating a predetermined state of the target device. As the predetermined condition, for example, "the number of members is equal to or larger than the predetermined number" and the like are exemplified.

When new training data is registered by the registration unit 16, the information illustrated in FIG. 4 is updated. Further, when new training data is registered by the registration unit 16, the number of reference members increases. Accordingly, the dimension of the N-dimensional data indicating the distance between the reference member and each member also increases.

When new training data is registered by the registration unit 16, the distance calculation unit 19 can update the value in the distance column illustrated in FIG. 3. For example, it is assumed that the number of reference members increases from 3 to 4 due to registration of new training data by the registration unit 16. In this case, the distance calculation unit 19 updates three-dimensional data (distance) indicating the distances between each member and each of the three reference members up to that point with four-dimensional data (distance) indicating the distances between each member and each of new four reference members.

Figure 6:
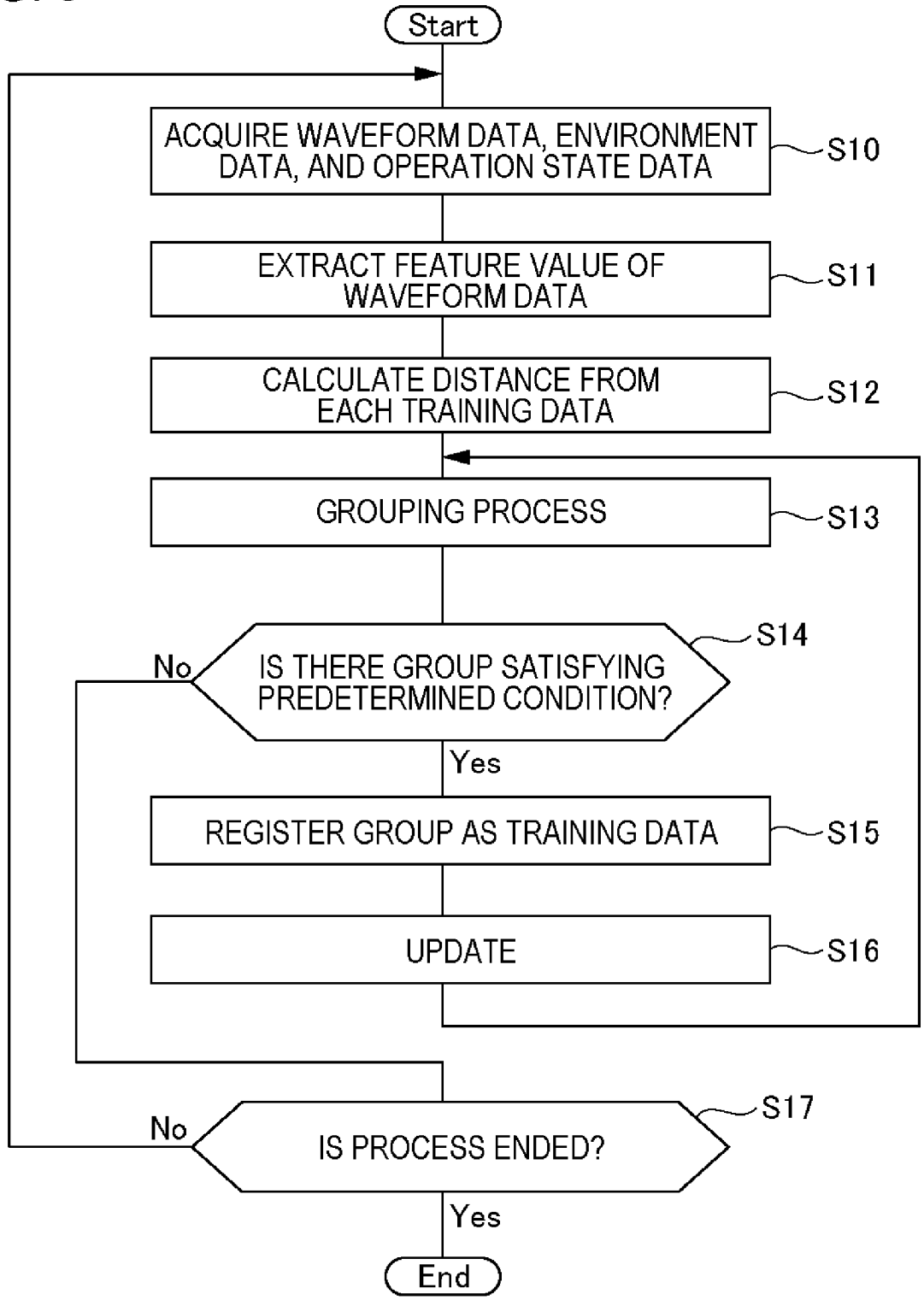
FIG. 6 is a flowchart illustrating an example of a process flow of the data processing apparatus of the present example embodiment.

Next, an example of a process flow of the data processing apparatus 10 of the present example embodiment will be described with reference to the flowchart of FIG. 6.

First, as preliminary preparation, two or more pieces of training data are registered (see FIG. 4). Each training data includes a waveform feature value, environment data, and operation state data. For example, wave training data at the time of startup, small load, and heavy load may be registered.

After the preliminary preparation, when the training data generation process is started, the waveform data acquisition unit 11 acquires the waveform data of the consumption current and/or the voltage of the target device in S10. Further, the environment data acquisition unit 13 acquires environment data indicating an environment of the target device at the time when the waveform data is acquired. Further, the operation state data acquisition unit 14 acquires operation state data indicating an operation state of the target device at the time when the waveform data is acquired.

In S11, the feature value extraction unit 12 processes the processing unit data in the waveform data acquired in S10 and extracts a predetermined waveform feature value.

In S12, the distance calculation unit 19 calculates a distance between the member including the waveform feature value of the waveform data extracted in S11 and the environment data and operation state data when the waveform data acquired in S10 is acquired, and each piece of training data (reference member) registered at that time and associates the calculated distance with the member (see FIG. 3).

In S13, the grouping unit 15 groups the members, on the basis of the distance from each of the plurality of pieces of training data (reference members) (grouping process). Thus, the information of FIG. 5 is updated.

After the information illustrated in FIG. 5 is updated by the grouping process, the registration unit 16 determines whether there is no group satisfying the predetermined condition for registering the group as training data (no group satisfying the predetermined condition newly occurs) (S14).

Here, for example, the predetermined condition is that the number of members is equal to or larger than the predetermined number.

In a case where there is a group satisfying the predetermined condition (Yes in S14), the registration unit 16 newly registers the group as training data indicating a predetermined state of the target device (S15). Thereafter, the distance calculation unit 19 updates the value in the distance column illustrated in FIG. 3 (S16). Specifically, the value in the distance column is updated with information indicating the distance between each member and each of a plurality of pieces of training data (reference member) including newly registered training data.

Thereafter, the grouping unit 15 groups the members, on the basis of the updated distance (grouping process). Thus, the information of FIG. 5 is updated. Thereafter, the process proceeds to S14, and the same process is repeated.

In S14, if there is no group satisfying the predetermined condition (No in S14), the process proceeds to S17.

In S17, it is determined whether to or not to end the training data generation process. If it is determined not to end (No in S17), the process returns to S10 and repeats the process. On the other hand, if it is determined to end (Yes in S17), the process is ended. For example, when conditions such as "no training data has been newly registered for a predetermined time or more", "the number of registered training data has reached a predetermined number", "execution time of training data generation process has reached a predetermined time", and "an instruction to end a process has been input from an operator" are satisfied, the data processing apparatus 10 determines to end the process.

According to the present example embodiment described above, it is possible to generate training data indicating a predetermined state of the target device while operating the target device. Therefore, for example, it is possible to generate training data while practically using the target device in everyday life.

In this way, since training data can be generated while the target device is practically used in everyday life, it is possible to reduce the effort of operating the target device only for generating the training data. In this case, it is not necessary to operate the target device uselessly, so it is expected to save electric bill and the like.

Further, in the present example embodiment, after grouping on the basis of the external environment data and the operation state data, it is possible to register the waveform feature value of the group satisfying the predetermined condition as the training data. Therefore, it is possible to register various training data according to various external environments and various operation states.

Further, in the present example embodiment, it is possible to register as training data, the waveform feature values of a group in which the number of members is equal to or larger than a predetermined number. That is, the waveform feature values of a group whose number of members does not reach the predetermined number are not registered as training data. In such a case, a waveform feature value temporarily appearing due to an unexpected operation of the target device is not registered as training data. As a result, registration of unnecessary training data can be reduced, and inconvenience that the number of training data becomes unnecessarily enlarged can be reduced.

Further, in the present example embodiment, a plurality of members can be grouped on the basis of distances from each of a plurality of pieces of training data (reference members) registered at that time. Therefore, it is unnecessary to prepare a large amount of training data, which is to be prepared first, and at least two training data may be prepared. There is no special condition for the training data to be prepared first, and it is possible to collect training data in environments that can be easily prepared, for example, where the temperatures, as one of the environment data, are 10° C. and 20° C., which makes it possible to greatly reduce the labor and time to prepare.

Second Example Embodiment

In addition to the functions described in the first example embodiment, the data processing apparatus 10 of the present example embodiment provides a function of inferring the state of a target device by using the training data generated by the function described in the first example embodiment. This will be described in detail below.

Figure 7:
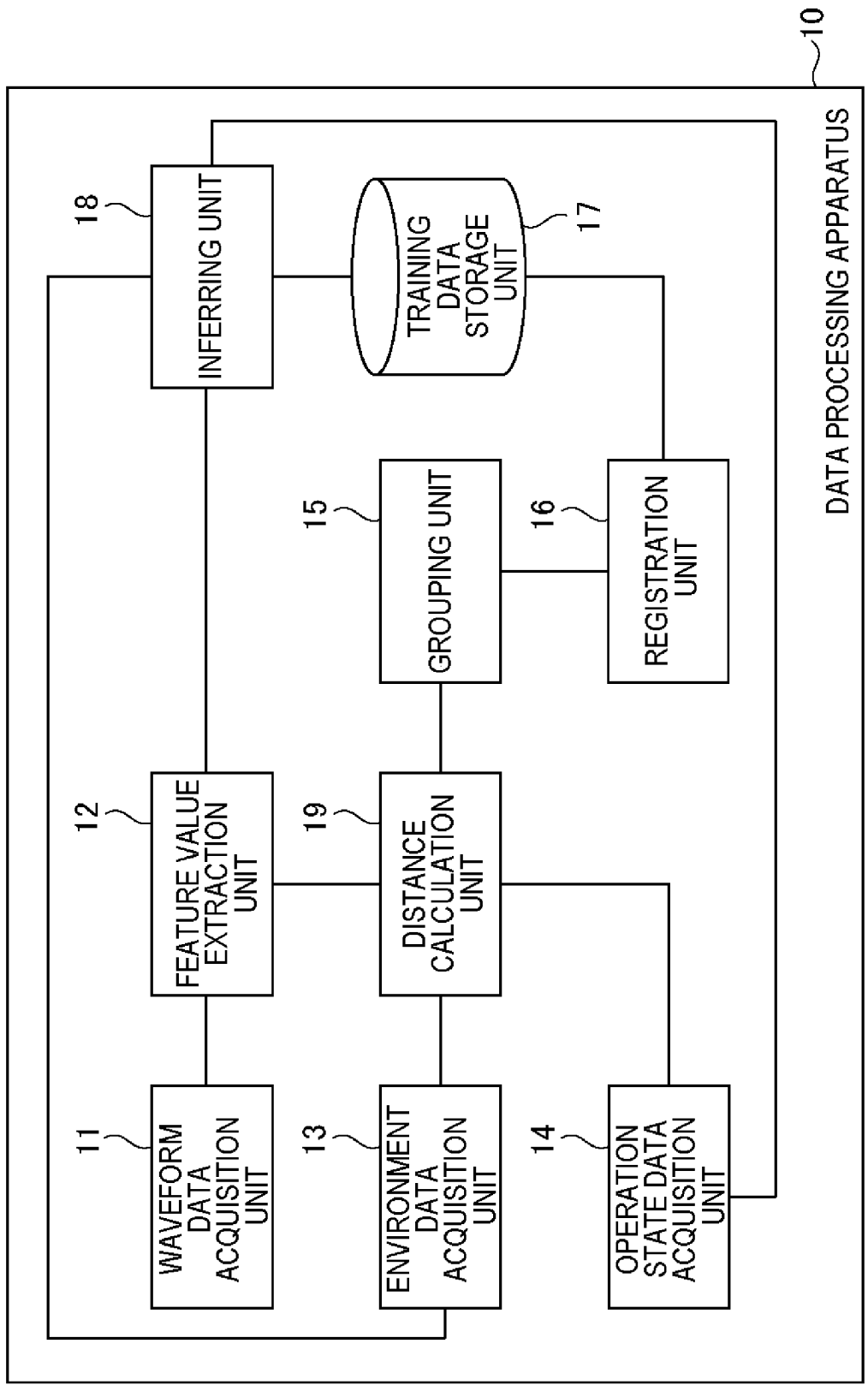
FIG. 7 is an example of a functional block diagram of the data processing apparatus of the present example embodiment.

FIG. 7 illustrates an example of a functional block diagram of the data processing apparatus 10 of the present example embodiment. As illustrated, the data processing apparatus 10 includes a waveform data acquisition unit 11, a feature value extraction unit 12, an environment data acquisition unit 13, an operation state data acquisition unit 14, a grouping unit 15, a registration unit 16, a training data storage unit 17, an inferring unit 18, and a distance calculation unit 19.

The configurations of the waveform data acquisition unit 11, the feature value extraction unit 12, the environment data acquisition unit 13, operation state data acquisition unit 14, the grouping unit 15, registration unit 16, and the distance calculation unit 19 are the same as those in the first example embodiment.

Training data (see FIG. 4) registered by the registration unit 16 is stored in the training data storage unit 17.

The inferring unit 18 infers the state of the target device by using the training data stored in the training data storage unit 17. Specifically, it is inferred whether the state of the target device is abnormal or normal.

For example, the inferring unit 18 generates an inference model by machine learning using the training data (waveform feature value in a normal state) and inputs a value of a new member acquired by the feature value extraction unit 12, the environment data acquisition unit 13, and the operation state data acquisition unit 14 to the generated inference model to obtain an inference result (normal or higher). The inference model can use, for example, a multiple regression analysis, a neural network, a hidden Markov model, or the like.

The inference process by the inferring unit 18 may be performed concurrently with the training data generating process described with reference to FIG. 6 in the first example embodiment or may be performed after the training data collecting process is completed. In any case, as the number of training data stored in the training data storage unit 17 increases, the inference accuracy by the inferring unit 18 increases.

According to the present example embodiment described above, the same advantageous effects as those of the first example embodiment can be realized. In addition, according to the present example embodiment, it is possible to infer the state (presence or absence of abnormality) of the target device. As described in the first example embodiment, according to the data processing apparatus 10 of the present example embodiment, various types of training data corresponding to various external environments and various operation states are generated and registered. By performing the inference process on the basis of such various training data, inference accuracy can be improved.

Third Example Embodiment

In the present example embodiment, various types of training data are collected by a cooperation process of a server (for example, a cloud server) and a plurality of terminal apparatuses.

FIG. 8 shows an example of a functional block diagram of the server 40 and the terminal apparatus 30. Each of the plurality of terminal apparatuses 30 includes a waveform data acquisition unit 11, a feature value extraction unit 12, an environment data acquisition unit 13, an operation state data acquisition unit 14, a training data storage unit 17-2, an inferring unit 18, and a transmitting and receiving unit 21. Note that, the training data storage unit 17-2 and the inferring unit 18 may not necessarily be included.

The configurations of the waveform data acquisition unit 11, the feature value extraction unit 12, the environment data acquisition unit 13, the operation state data acquisition unit 14, and the inferring unit 18 are the same as those in the first and second example embodiments. The transmitting and receiving unit 21 transmits and receives data to and from another apparatus (for example: server 40). The training data storage unit 17-2 stores a plurality of pieces of training data.

The server 40 includes a grouping unit 15, a registration unit 16, a training data storage unit 17-1, a distance calculation unit 19, and a transmitting and receiving unit 20.

The configurations of the grouping unit 15, the registration unit 16, and the distance calculation unit 19 are the same as in the first and second example embodiments. The transmitting and receiving unit 20 transmits and receives data to and from another apparatus (for example: a plurality of terminal apparatuses 30). The training data storage unit 17-1 stores a plurality of pieces of training data.

The plurality of terminal apparatuses 30 are installed corresponding to each of the plurality of target devices. The plurality of terminal apparatuses 30 may be installed at locations geographically distant from each other. The plurality of terminal apparatuses 30 acquires the waveform feature value, the environment data, and the operation state data corresponding to each of the plurality of target devices and transmits them to the server 40. The terminal apparatus 30 may transmit the waveform feature value, the environment data, and the operation state data to the server 40 in association with the identification information (model number or the like) of the corresponding target device.

The server 40 groups the waveform feature value, the environment data, and the operation state data acquired from each of the plurality of terminal apparatuses 30. Then, a group satisfying the predetermined condition is registered as training data.

The server 40 can transmit the training data registered in the training data storage unit 17-1 to each of the plurality of terminal apparatuses 30. Each terminal apparatus 30 registers the training data received from the server 40 in the training data storage unit 17-2. Then, the inferring unit 18 infers the state of the target device by using the training data stored in the training data storage unit 17-2.

According to the present example embodiment described above, since data (waveform feature value, environment data, and operation state data) can be collected by the plurality of terminal apparatuses 30, it is possible to collect a large amount of data in a short time. As a result, training data can be efficiently generated.

Further, by installing a plurality of terminal apparatuses in various locations, it is possible to generate various training data in which environment factors (temperature difference, humidity difference, day and night temperature difference, or the like) caused by the geographical positions are incorporated.

Examples of a reference aspect will be added below.

1. A data processing apparatus including:
   a waveform data acquisition unit which acquires waveform data of a consumption current and/or a voltage of a target device;
   a feature value extraction unit which extracts a waveform feature value from the waveform data;
   an environment data acquisition unit which acquires environment data indicating an environment of the target device at the time when the waveform data is acquired;
   an operation state data acquisition unit which acquires operation state data indicating an operation state of the target device at the time when the waveform data is acquired;
   a distance calculation unit which calculates a distance between each of members including the waveform feature value, the environment data, and the operation state data and each of a plurality of reference members;
   a grouping unit which groups the members, on the basis of the distance from each of the plurality of reference members; and
   a registration unit which registers a group satisfying a predetermined condition as training data.

2. The data processing apparatus according to 1.,
   wherein the distance calculation unit calculates the distance by using the registered training data as the reference member.

3. The data processing apparatus according to 1. or 2.,
   wherein the registration unit registers the group in which the number of the members is equal to or greater than a predetermined number as the training data.

4. The data processing apparatus according to any one of 1. to 3.,
   wherein the environment data acquisition unit acquires at least one of temperature, humidity, and weather, as the environment data.

5. The data processing apparatus according to any one of 1. to 4.,
   wherein the operation state data acquisition unit acquires the operation state data from the target device and/or a sensor attached to the target device.

6. The data processing apparatus according to any one of 1. to 5.,
   an inferring unit which infers a state of the target device, by using the training data.

7. A data processing system including a plurality of terminal apparatuses and a server,
   wherein each of the terminal apparatuses includes
   a waveform data acquisition unit which acquires waveform data of a consumption current and/or a voltage of a target device,
   a feature value extraction unit which extracts a waveform feature value from the waveform data,
   an environment data acquisition unit which acquires environment data indicating an environment of the target device at the time when the waveform data is acquired,
   an operation state data acquisition unit which acquires operation state data indicating an operation state of the target device at the time when the waveform data is acquired, a transmitting and receiving unit which transmits the waveform feature value, the environment data, and the operation state data to the server, and wherein the server includes a transmitting and receiving unit which receives the waveform feature value, the environment data, and the operation state data from each of the plurality of terminal apparatuses, a distance calculation unit which calculates a distance between each of members including the waveform feature value, the environment data, and the operation state data and each of a plurality of reference members, a grouping unit which groups the members, on the basis of the distance from each of the plurality of reference members, and a registration unit which registers a group satisfying a predetermined condition as training data.

8. The data processing system according to 7., wherein the transmitting and receiving unit of the server transmits the training data registered by the registration unit to each of the plurality of terminal apparatuses.

9. A data processing method executed by a computer, the method including:

a waveform data acquisition step of acquiring waveform data of a consumption current and/or a voltage of a target device;

a feature value extraction step of extracting a waveform feature value from the waveform data;

an environment data acquisition step of acquiring environment data indicating an environment of the target device at the time when the waveform data is acquired;

an operation state data acquisition step of acquiring operation state data indicating an operation state of the target device at the time when the waveform data is acquired;

a distance calculation step of calculating a distance between each of members including the waveform feature value, the environment data, and the operation state data and each of a plurality of reference members;

a grouping step of grouping the members, on the basis of the distance from each of the plurality of reference members; and a registration step of registering a group satisfying a predetermined condition as training data.

9-2. The data processing method according to 9., wherein in the distance calculation step, the distance is calculated by using the registered training data as the reference member.

9-3. The data processing method according to 9. or 9-2., wherein in the registration step, the group in which the number of the members is equal to or greater than a predetermined number is registered as the training data.

9-4. The data processing method according to any one of 9. to 9-3., wherein in the environment data acquisition step, at least one of temperature, humidity, and weather is acquired as the environment data.

9-5. The data processing method according to any one of 9. to 9-4., wherein in the operation state data acquisition step, the operation state data is acquired from the target device and/or a sensor attached to the target device.

9-6. The data processing method executed by the computer according to any one of 9. to 9-5., the method further including:

an inferring step of inferring a state of the target device, by using the training data.

10. A program causing a computer to function as:

a waveform data acquisition unit which acquires waveform data of a consumption current and/or a voltage of a target device;

a feature value extraction unit which extracts a waveform feature value from the waveform data;

an environment data acquisition unit which acquires environment data indicating an environment of the target device at the time when the waveform data is acquired;

an operation state data acquisition unit which acquires operation state data indicating an operation state of the target device at the time when the waveform data is acquired;

a distance calculation unit which calculates a distance between each of members including the waveform feature value, the environment data, and the operation state data and each of a plurality of reference members;

a grouping unit which groups the members, on the basis of the distance from each of the plurality of reference members; and a registration unit which registers a group satisfying a predetermined condition as training data.

10-2. The program according to 10., wherein the distance calculation unit calculates the distance by using the registered training data as the reference member.

10-3. The program according to 10. or 10-2., wherein the registration unit registers the group in which the number of the members is equal to or greater than a predetermined number as the training data.

10-4. The program according to any one of 10. to 10-3., wherein the environment data acquisition unit acquires at least one of temperature, humidity, and weather, as the environment data.

10-5. The program according to any one of 10. to 10-4., wherein the operation state data acquisition unit acquires the operation state data from the target device and/or a sensor attached to the target device.

10-6. The program according to any one of 10. to 10-5., further including:

an inferring unit which infers a state of the target device, by using the training data.

The invention claimed is:

1. A data processing apparatus comprising:

at least one memory configured to store one or more programs; and at least one processor configured to execute the one or more programs to:

acquire waveform data of a consumption current and/or a voltage of a target device;

extract a waveform feature value from the waveform data;

acquire environment data indicating an environment of the target device at a time when the waveform data is acquired;

acquire operation state data indicating an operation state of the target device at the time when the waveform data is acquired;

calculate a distance between each member among a plurality of members including the waveform feature value, the environment data, and the operation state data and each reference member among a plurality of reference members on the basis of the waveform feature value, the environment data, and the operation state data;

group the plurality of members, on the basis of the distance from each of the plurality of reference members;

register a group satisfying a predetermined condition as training data; and execute the one or more programs to infer a state of the target device by machine learning using the training data.

2. The data processing apparatus according to claim 1, wherein the processor is further configured to execute the one or more programs to calculate the distance by using the registered training data as the reference member.

3. The data processing apparatus according to claim 1, wherein the processor is further configured to execute the one or more programs to register the group in which the number of the members is equal to or greater than a predetermined number as the training data.

4. The data processing apparatus according to claim 1, wherein the processor is further configured to execute the one or more programs to acquire at least one of temperature, humidity, and weather, as the environment data.

5. The data processing apparatus according to claim 1, wherein the processor is further configured to execute the one or more programs to acquire the operation state data from the target device and/or a sensor attached to the target device.

6. The data processing apparatus according to claim 1, wherein the processor is further configured to execute the one or more programs to:

create N-dimensional data indicating a distance from each of a plurality of N reference members, in which N is an integer of two or more, and group the plurality of members on the basis of a similarity of the N-dimensional data.

7. A data processing system comprising:

a plurality of terminal apparatuses; and a server, wherein each of the terminal apparatuses comprises:

at least one memory configured to store one or more instructions; and at least one processor configured to execute the one or more instructions to:

acquire waveform data of a consumption current and/or a voltage of a target device, extract a waveform feature value from the waveform data, acquire environment data indicating an environment of the target device at a time when the waveform data is acquired, acquire operation state data indicating an operation state of the target device at the time when the waveform data is acquired, and transmit the waveform feature value, the environment data, and the operation state data to the server, and wherein the server comprises:

at least one memory configured to store one or more programs; and at least one processor configured to execute the one or more programs to:

receive the waveform feature value, the environment data, and the operation state data from each of the plurality of terminal apparatuses, calculate a distance between each member among a plurality of members including the waveform feature value, the environment data, and the operation state data and each reference member among a plurality of reference members on the basis of the waveform feature value, the environment data, and the operation state data, group the plurality of members, on the basis of the distance from each of the plurality of reference members, register a group satisfying a predetermined condition as training data, and execute the one or more programs to infer a state of the target device by machine learning using the training data.

8. The data processing system according to claim 7, wherein the processor of the server is further configured to execute the one or more programs to transmit the training data registered by the registration unit to each of the plurality of terminal apparatuses.

9. A data processing method executed by a computer, the method comprising:

acquiring waveform data of a consumption current and/or a voltage of a target device;

extracting a waveform feature value from the waveform data;

acquiring environment data indicating an environment of the target device at a time when the waveform data is acquired;

acquiring operation state data indicating an operation state of the target device at the time when the waveform data is acquired;

calculating a distance between each member among a plurality of members including the waveform feature value, the environment data, and the operation state data and each reference member among a plurality of reference members on the basis of the waveform feature value, the environment data, and the operation state data;

grouping the plurality of members, on the basis of the distance from each of the plurality of reference members;

registering a group satisfying a predetermined condition as training data; and inferring a state of the target device by machine learning using the training data.

10. A non-transitory storage medium storing a program causing a computer to:

acquire waveform data of a consumption current and/or a voltage of a target device;

extract a waveform feature value from the waveform data;

acquire environment data indicating an environment of the target device at a time when the waveform data is acquired;

acquire operation state data indicating an operation state of the target device at the time when the waveform data is acquired;

calculate a distance between each member among a plurality of members including the waveform feature value, the environment data, and the operation state data and each reference member among a plurality of reference members on the basis of the waveform feature value, the environment data, and the operation state data;

group the plurality of members, on the basis of the distance from each of the plurality of reference members;

register a group satisfying a predetermined condition as training data; and infer a state of the target device by machine learning using the training data.

* * * * *